(12) United States Patent
Shimizu et al.

(10) Patent No.: US 6,218,794 B1
(45) Date of Patent: Apr. 17, 2001

(54) SPINDLE MOTOR STARTUP METHOD AND APPARATUS

(75) Inventors: Yasuhito Shimizu, Yamato; Naoyuki Kagami; Akira Tokizono, both of Fujisawa; Akihiro Ohyama, Funabaski, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/429,529

(22) Filed: Oct. 28, 1999

(30) Foreign Application Priority Data

Oct. 28, 1998 (JP) .................................................. 10-306699

(51) Int. Cl.[7] ...................................................... H02P 1/18
(52) U.S. Cl. ........................ 318/254; 318/138; 318/439; 310/156
(58) Field of Search ................................... 318/254, 138, 318/439; 310/156

(56) References Cited

U.S. PATENT DOCUMENTS

| 4,673,849 | * | 6/1987 | Sears et al. | 318/272 |
| 5,107,159 | * | 4/1992 | Kordik | 310/156 |
| 5,783,917 | * | 7/1998 | Takekawa | 318/439 |
| 5,801,500 | * | 9/1998 | Jensen et al. | 318/254 |
| 5,814,957 | * | 9/1998 | Yoshida | 318/439 |

* cited by examiner

Primary Examiner—Robert E. Nappi
Assistant Examiner—Rita Leykin
(74) Attorney, Agent, or Firm—Robert B. Martin

(57) ABSTRACT

A spindle motor start up method wherein a torque balance between the stator and rotor is broken so as to avoid startup malfunctions, and thereby improve motor startup time in spindle motors prone to startup malfunctions, such as hard disk drive motors having a 4:3 ratio of the number of rotor magnetic poles to the number of stator slots. Processes for breaking a torque balance according to the present invention include: (1) gradually decreasing an initial commutation (switching of each phase) frequency at the startup timing from a frequency higher than a commutation frequency in a conventional startup; (2) gradually decreasing an initial commutation frequency at the startup timing from a frequency higher than a commutation frequency in a conventional startup to a low frequency, and next, gradually increasing the initial frequency from the low frequency; (3) changing a drive current of the spindle motor so as to break a torque balance between the spindle motor stator and rotor; (4) monitoring a back electromotive force detection signal while commutating, and restarting commutation when the back electromotive force detection signal is not detected; and (5) monitoring a back electromotive force detection signal while commutating, resetting the commutation at a time in a commutation sequence after an initial commutation from a first phase to a second phase, and restarting the commutation from the first phase to the second phase.

5 Claims, 5 Drawing Sheets

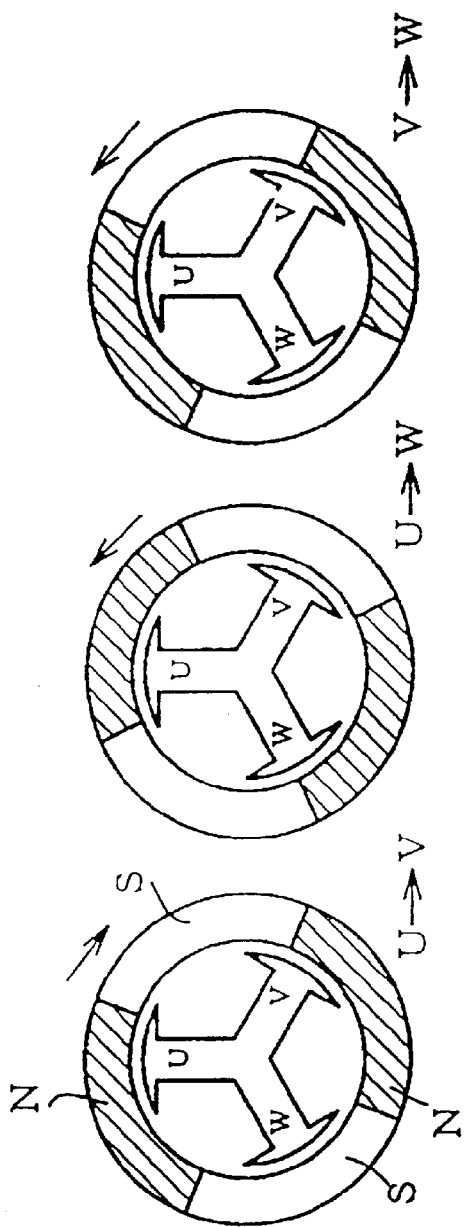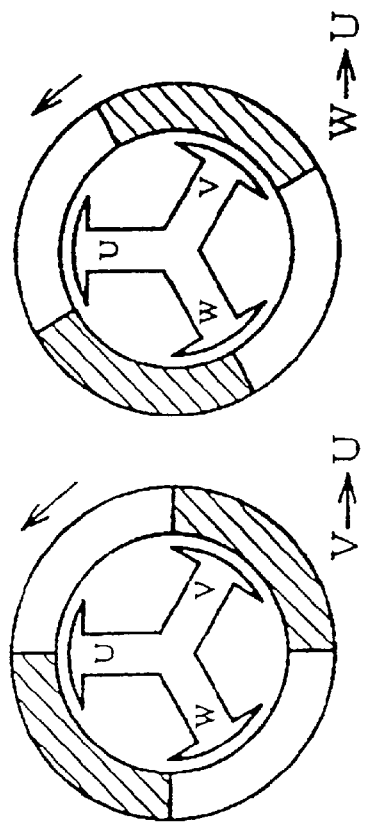
FIG. 3A  U→V
FIG. 3B  U→W
FIG. 3C  V→W
FIG. 3D  V→U
FIG. 3E  W→U

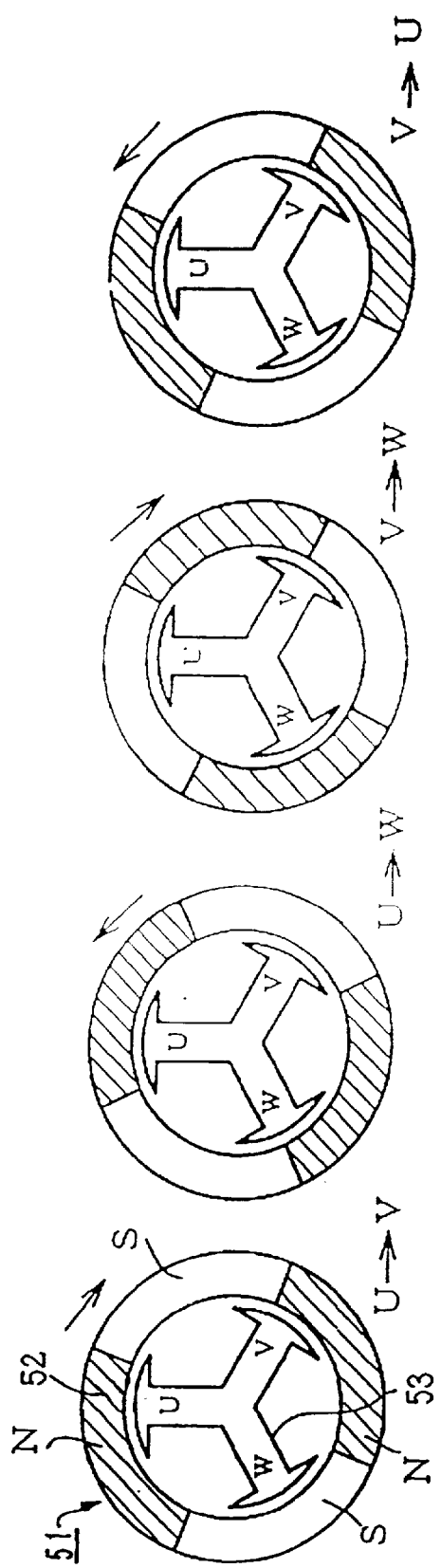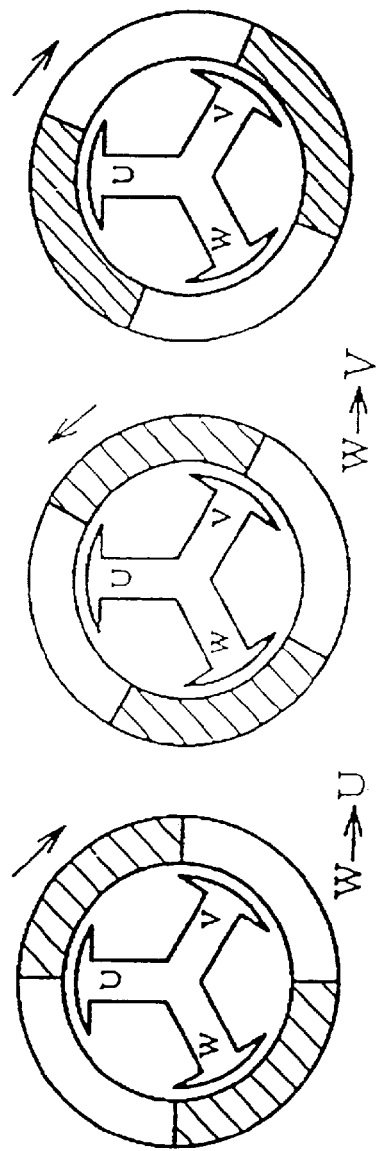
FIG. 5A
FIG. 5B
FIG. 5C
FIG. 5D
FIG. 5E
FIG. 5F
FIG. 5G

SPINDLE MOTOR STARTUP METHOD AND APPARATUS

BACKGROUND OF THE INVENTION

1. Field of the Invention

The present invention relates to a spindle motor startup method, and more particularly to a startup method for spindle motors prone to torque balance conditions, such as where the ratio of the number of rotor magnetic poles to the number of stator slots is 4:3.

2. Background Art

Conventional 3.5" hard disk drives (HDD) having rotational speeds of at least 7200 rpm are typically equipped with a spindle motor such as an eight-pole twelve-slot spindle motor having a rotor magnetic pole to stator slot ratio of 2:3 for optimum startup characteristics. Alternatively, such disk drives may have a spindle motor like an eight-pole nine-slot spindle motor that has a construction to break a torque balance. Startup malfunctions caused by a magnetic balance between a rotor and a stator seldom occur in these types of motors. Recently, three-phase spindle motors such as a twelve-pole nine-slot spindle motor have started to be commonly used in disk drives. In these drives the ratio of the number of rotor magnetic poles to stator slots is 4:3.

Spindle motors with a 4:3 ratio of rotor magnetic poles to stator slots, like the twelve-pole nine-slot spindle motor described above, are prone to startup problems because the initial starting-torque capacity may not be adequate to overcome a magnetic balance that is created in certain startup positions of the rotor and stator. Such startup malfunctions result in long startup times for the motors, which is a critical parameter in applications such as disk drives.

FIGS. 5A through 5G show the rotor position in a four-pole three-slot spindle motor as a function of time in a startup malfunction. FIG. 5A shows the initial rotor position, and FIGS. 5B–5G sequentially show the motor at subsequent times. The four-pole three-slot spindle motor 51 comprises a cylindrical rotor 52 comprising four poles composed of pairs of the north and south poles, and a stator 53 composed of three slots, that is, U, V, and W phases. Furthermore, as shown in FIGS. 5A through 5G, a driver not shown switches current for starting the motor in the order of the U phase to the V phase, the U to the W, the V to the U, the W to the U, and the W to the V. At this time, the startup malfunction is shown as a state of not being able to normally start the rotation of the motor with sequentially repeating reverse rotation and normal rotation as shown in FIGS. 5A through 5G. This is because rotor 52 and stator 53 are magnetically balanced due to relative positions of rotor 52 and stator 53 at the time the motor stopped as shown in FIG. 5A, and the magnetic circuit cannot generate sufficient initial starting-torque to break the balance.

An object of the present invention is to provide a spindle motor apparatus and a startup method that can provide excellent startup performance even in spindle motor configurations that are prone to startup malfunctions, such as where the ratio of rotor magnetic poles to stator slots is 4:3.

SUMMARY OF THE INVENTION

The present invention provides a spindle motor start up method wherein a torque balance between the stator and rotor is broken so as to avoid startup malfunctions, and thereby improve motor startup time. In a preferred embodiment the present invention is implemented in spindle motor configurations prone to startup malfunctions, such as those having a 4:3 ratio of the number of rotor magnetic poles to the number of stator slots. Startup time is a critical performance parameter for spindle motors in data storage devices, such as disk drives. Processes for breaking a torque balance according to the present invention include:

(1) gradually decreasing an initial commutation (switching of each phase) frequency at the startup timing from a frequency higher than a commutation frequency in a conventional startup;

(2) gradually decreasing an initial commutation frequency at the startup timing from a frequency higher than a commutation frequency in a conventional startup to a low frequency, and next, gradually increasing the initial frequency from the low frequency;

(3) changing a drive current of the spindle motor so as to break a torque balance between the spindle motor stator and rotor;

(4) monitoring a back electromotive force detection signal while commutating, and restarting commutation when the back electromotive force detection signal is not detected;

(5) resetting the commutation at a time in a commutation sequence after an initial commutation from a first phase to a second phase, and restarting the commutation from the first phase to the second phase; and (6) monitoring a back electromotive force detection signal while commutating, resetting the commutation at a time in a commutation sequence after an initial commutation from a first phase to a second phase, and restarting the commutation from the first phase to the second phase.

BRIEF DESCRIPTION OF THE DRAWINGS

FIGS. 3A through 3E illustrate the rotor position in a four-pole three-slot spindle motor in a normal startup operation according to an embodiment of the present invention;

FIGS. 5A through 5G show the rotor position in a four-pole three-slot spindle motor as a function of time in a startup malfunction.

DETAILED DESCRIPTION OF THE PREFERRED EMBODIMENTS

Figure 1:
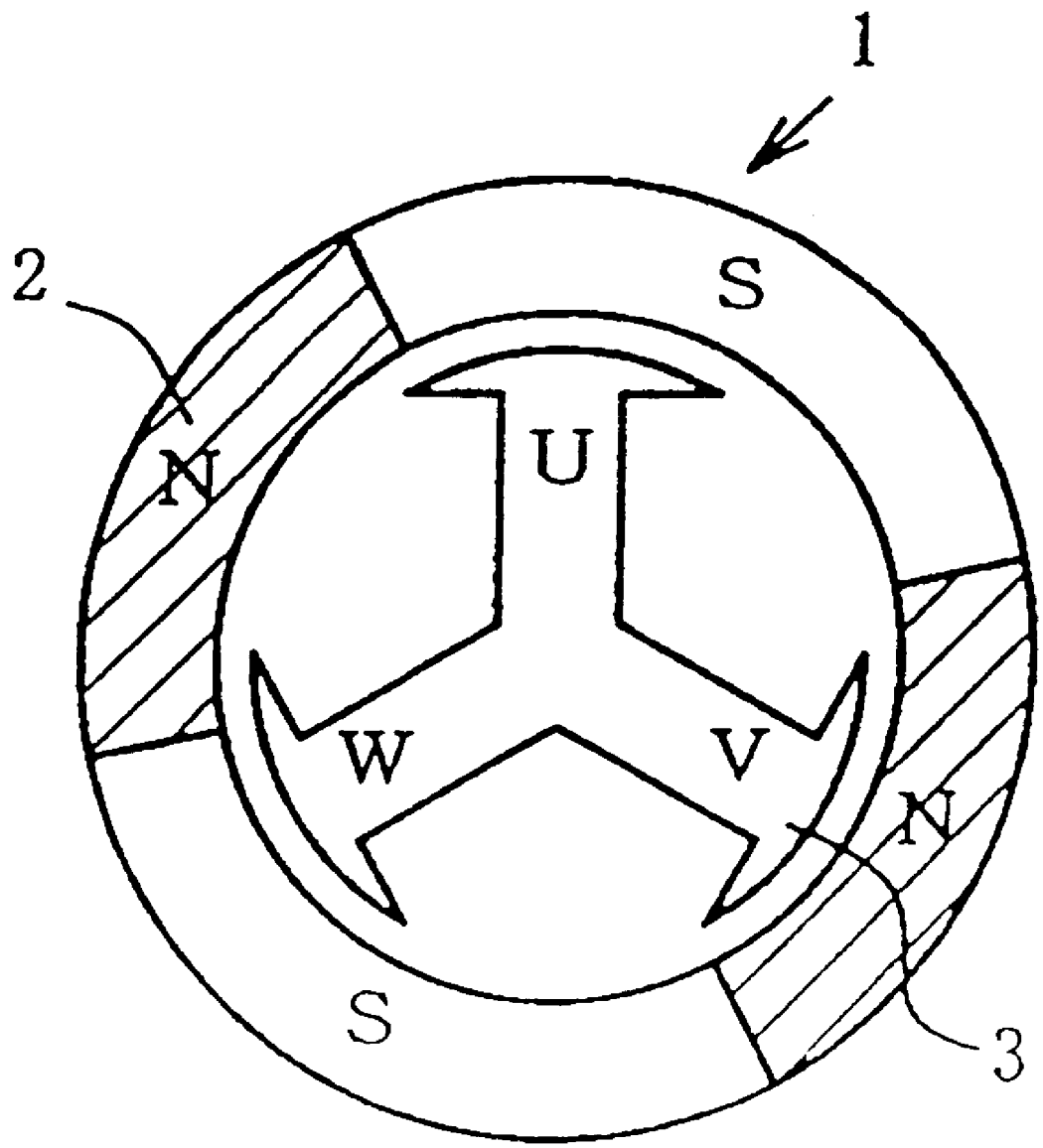
FIG. 1 illustrates a four-pole three-slot spindle motor according to an embodiment of the present invention.

FIG. 1 illustrates a four-pole three-slot spindle motor 1 according to an embodiment of the present invention. Spindle motor 1 comprises a cylindrical rotor 2 comprised of four poles composed of pairs of north and south poles, and a stator 3 composed of three slots, namely, the U, V, and W phases. Stator 3 is fixed and rotor 2 rotates. A driver, not shown, rotates the rotor by switching current in the order of the U phase to the V phase, the U to the W, the V to the W, the V to the U, the W to the U, and the W to the V.

Figure 2:
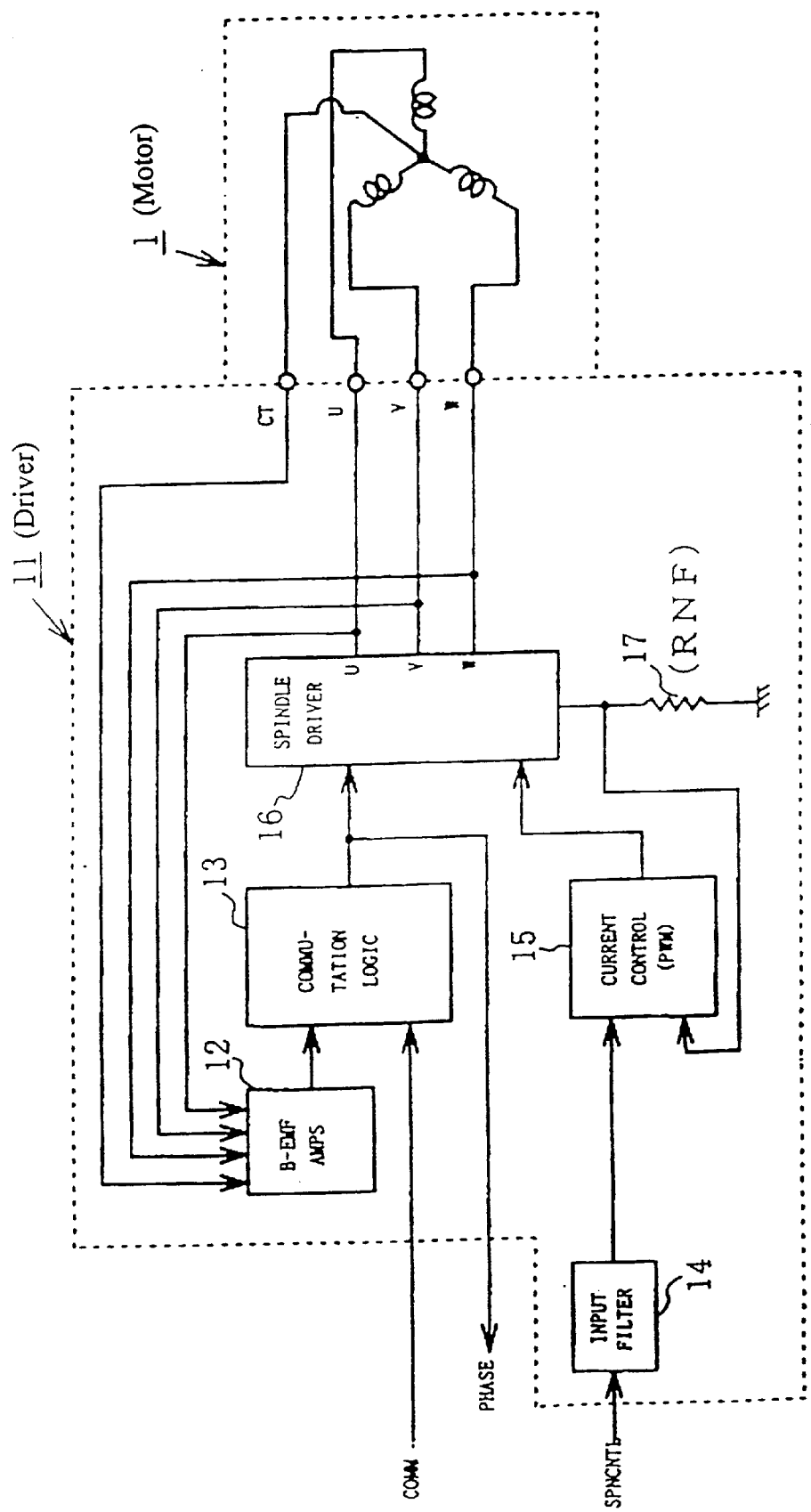
FIG. 2 is a block diagram of a driver for a four-pole three-slot spindle motor according to an embodiment of the present invention.

FIG. 2 is a block diagram of a driver 11 for a four-pole three-slot spindle motor according to an embodiment of the present invention. Driver 11 comprises a B-EMF (Back Electromotive Force) amplifier 12, a commutation logic circuit 13, an input filter 14, a current control (PWM) circuit 15, and a spindle driver 16. B-EMF amplifier 12 accepts signals in the U, V, W, and CT phases in stator 3 of spindle motor 1, respectively, and detects a back electromotive force of a back electromotive force detection signal included in an OFF phase of the three-phase motor. Commutation logic circuit 13 accepts an output of B-EMF amplifier 12 and a COMM signal that is a timing signal showing phase switching, and determines the switch timing of a three-phase motor driver bridge in spindle driver 16.

When the back electromotive force is detected commutation logic circuit's 13 output becomes a PHASE signal showing the motor timing. The SPNCNTL signal is provided to input filter 14 to control the spindle. Input filter 14 provides an output signal to current control (pwm) circuit 15. RNF resistor 17 detects a current value in the spindle and provides a corresponding input signal to current control (pwm) circuit 15. Current control (pwm) circuit 15 provides a feedback circuit to maintain a constant current in spindle motor 1. Spindle driver 16 accepts an output of commutation logic circuit 13 and an output of current control (pwm) circuit 15. Spindle driver 16 outputs a signal every U, V, or W phase for rotating the motor. Spindle driver 16 comprises a bridge driver composed of transistors or MOSFETS.

Based on the COMM signal, which shows phase switching timing, and the SPNCNTL signal for spindle control, driver 11 switches the currents flowing into the U, V, and W phases to rotate spindle motor 1. Driver 11 also outputs a PHASE signal which provides a signal for monitoring the spindle motor 1 rotation.

A startup method for a spindle motor according to the present invention is now described with reference to spindle motor 1 and driver 11 shown in FIGS. 1 and 2 respectively. Spindle motor 1 has a 4:3 ratio of rotor magnetic poles to stator slots. The present invention startup method includes a process to break a torque balance between rotor 2 and stator 3 so as to avoid startup malfunctions. Torque balance refers to the condition in conventional motors when repeated attempts at alternately normal and reverse rotation fail due to a resistive force between rotor 2 and stator 3. As described above torque balance conditions frequently occur in 4:3 ratio motors due to a magnetic balance between the stator and rotor.

FIGS. 3A through 3E illustrate the rotor position in a four-pole three-slot spindle motor in a normal startup operation according to an embodiment of the present invention. FIG. 3A shows the initial rotor position, and FIGS. 3B–3E sequentially show the motor at subsequent times. In one embodiment, the commutation frequency is gradually decreased from an initial commutation frequency to break a startup torque balance. In this embodiment of the present invention a higher initial commutation frequency is used than in a typical conventional system. Alternatively, to break a startup torque balance a process of first gradually decreasing the commutation frequency from a high initial frequency to a low frequency, and next, gradually increasing the frequency from the low frequency can be used. Here again, a higher initial commutation frequency is used than in a typical conventional system. For example, with a commutation frequency of 720 Hz at a predetermined rotation speed in a twelve-pole nine-slot spindle motor, a typical conventional startup commutation frequency may be nearly 40 Hz. After starting at 40 Hz, the commutation frequency in such a conventional system may be gradually accelerated to 720 Hz. By contrast in an embodiment of the present invention a typical startup frequency for such a system is nearly 200 Hz, and a low frequency value of nearly 20 Hz is used.

In a further embodiment, a process to break a startup torque balance comprises changing the drive current setting when switching phase excitation. For example, the drive current setting is changed at the time of the switch from the U phase to the V phase, and is changed again at the time of the switch from the U phase to the W phase in the phase excitation by commutation. More specifically, a current control (pwm) circuit 15 duty ratio is changed based on the switching of each commutation phase. This method reduces the repetition of normal and reverse rotation attempts, and thereby shortens the startup time.

A further process to break a startup torque balance comprises monitoring a back electromotive force detection signal while performing commutation, and performing a restart if the back electromotive force detection signal is not detected. When the back electromotive force detection signal is not detected, this indicates that the motor has malfunctioned. Therefore, restarting the motor when the back electromotive force detection signal is not detected, shortens the startup malfunction duration. In the restart process to facilitate breaking the torque balance, the startup current value can be increased or decreased from the previous value, or the commutation frequency can be increased or decreased.

In addition, as a further process to break a startup torque balance the commutation is reset midway through the performance of a sequence of commutations in the order of the U phase to the V phase, the U phase to the W phase, the V phase to the W phase etc. After the reset, commutation is restarted with the commutation from the U phase to the V phase. This process can reduce the sequential repetition of the normal and reverse rotation by shifting the relative positions of rotor 2 and stator 3, and thereby shorten the startup time. This process is also effective at any time in the commutation sequence so long as the reset is not performed during the first commutation. In a preferred embodiment, a reset is performed after three commutations have been performed, for example, the commutation from the U phase to the V phase, the U to the W, and the V to the W.

Another process that can be used to break a startup torque balance comprises monitoring a back electromotive force detection signal while performing commutation, and restarting the commutation from the U phase to the V phase at two points, namely, at a rising edge and at a trailing edge of an initial back electromotive force detection signal. In this method, by restarting the commutation from the U phase to the V phase, it becomes possible to fix the direction of a small back electromotive force, which in turn can shorten the startup time. Restarting commutation at the two points, accounts for when at the initial time it is not known whether the rotational direction is normal or reverse. Also, in this method, the rotational direction is determined by monitoring the frequency of the back electromotive force detection signal.

A further technique to overcome torque balance problems, comprises generating nonuniformity by intentionally shifting the magnetization accuracy in the motor construction so as to shift the interval of a pole. For example, the length, along the circumference of the rotor, of a north pole section may be increased, and the length of a south pole section correspondingly decreased. This process of breaking the torque balance can also be used to shorten a motor's startup time.

Figure 4A:
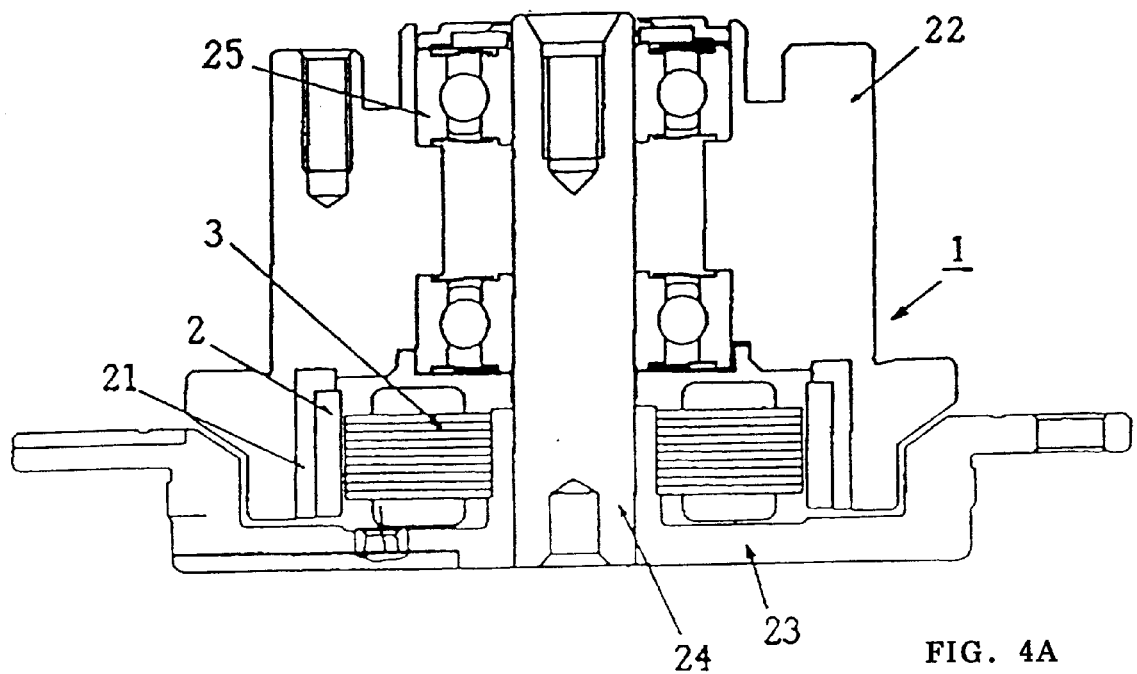
FIG. 4A is a side view of a twelve-pole nine-slot spindle motor according to an embodiment of the present invention.
Figure 4B:
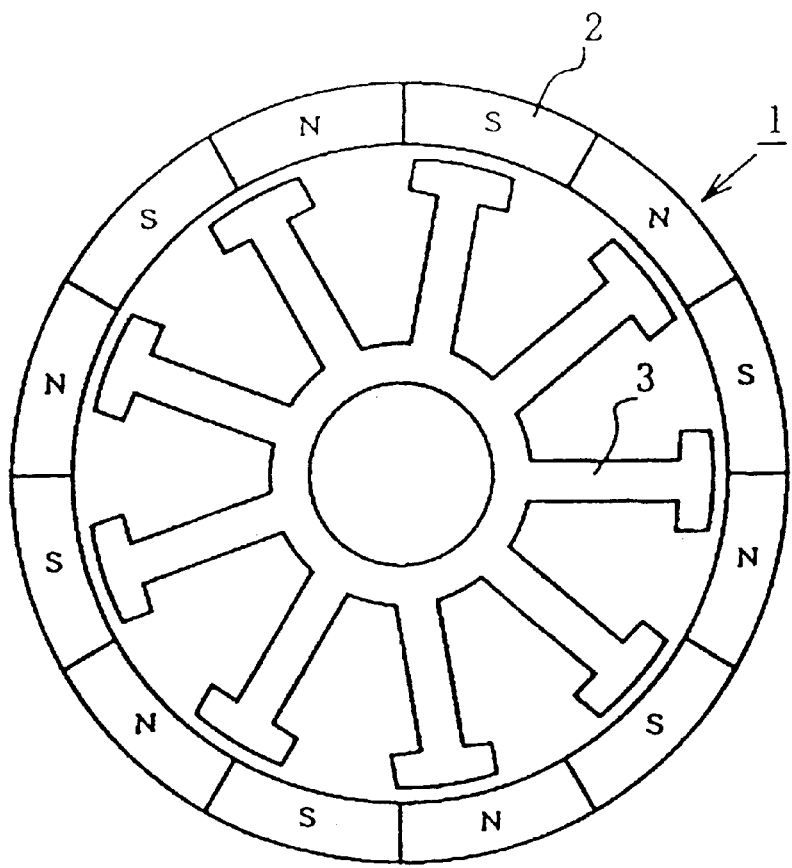
FIG. 4B is a top view of the rotor and stator of the twelve-pole nine-slot spindle motor.

FIGS. 4A and 4B illustrate a twelve-pole nine-slot spindle motor that can be used in a hard disk drive. FIG. 4A is a side view of the spindle motor, and FIG. 4B is a top view of the rotor and stator. In the motor shown in FIGS. 4A and 4B, the main part of spindle motor 1 comprises a cylindrical rotor 2 comprised of twelve poles each of which are in turn composed of a north and a south pole, and a stator 3 composed of nine slots. More specifically stator 3 is composed of three three-slot sets, each three-slot set is in turn composed of U, V, and W phases. Stator 3 is located inside the circular area formed by rotor 2. Rotor 2 is installed in a hub 22 through a yoke 21. Stator 3 is installed in a flange 23. A shaft 24 is installed in one piece in the center of flange 23. Furthermore, by providing ball bearings 25 in two locations between hub 22 and flange 23, the motor is constructed to enable rotation between hub 22 and flange 23. In the embodiment shown, since flange 23 is fixedly installed in the hard disk drive, hub 22 rotates.

As seen from the above description, the present invention provides several processes for changing a starting commutation torque so as to break a torque balance between a rotor and stator. The present invention thereby enables fast, reliable startup of three-phase spindle motors, including for example, twelve-pole nine-slot spindle motors with a 4:3 ratio of the number of rotor magnetic poles to stator slots.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A startup method for a spindle motor comprising the steps of:
   commutating a spindle motor at a first initial commutation frequency;
   monitoring a back electromotive force detection signal while commutating;
   restarting communication when the back electromotive force detection signal is not detected;
   changing a drive current of the spindle motor so as to restart commutation and setting said commutation frequency to a second initial commutation frequency.

2. A startup method for a spindle motor comprising the steps of:
   commutating a spindle motor at an initial commutation frequency;
   resetting commutation so as to break a torque balance between the spindle motor stator and rotor
   resetting the commutation at a time in a commutation sequence after an initial commutation from a first phase to a second phase, and;
   restarting the commutation from the first phase to the second phase.

3. The startup method for a spindle motor of claim 2 wherein said resetting step further comprises the steps of:
   monitoring a back electromotive force detection signal while commutating; and
   resetting commutation at a rising edge of the back electromotive force detection signal and at a trailing edge of the back electromotive force detection signal.

4. An apparatus having a spindle motor comprising:
   a rotor;
   a stator;
   a back electromotive force detection circuit; and
   a commutation controller coupled to said rotor, said stator, and to said back electromotive force detection circuit, wherein said commutation controller is configured to perform the steps of:
      commutating the spindle motor at a first initial commutation frequency;
      monitoring a back electromotive force detection signal while commutating;
      restarting commutation when the back electromotive force detection signal is not detected.
      changing a drive current of the spindle motor so as to restart commutation;
      setting said commutation frequency to a second initial commutation frequency.

5. An apparatus having a spindle motor comprising:
   a rotor;
   a stator;
   a back electromotive force detection circuit;
   a commutation controller coupled to said rotor and to said stator, wherein said commutation controller is configured to perform the steps of:
      commutating the spindle motor at an initial commutation frequency; and
      resetting commutation so as to break a torque balance between the spindle motor stator and rotor at a rising edge of the back electromotive force detection signal and at a trailing edge of the back electromotive force detection signal.

* * * * *